US00RE43925E

(19) United States
(12) Reissued Patent
Wang et al.

(10) Patent Number: US RE43,925 E
(45) Date of Reissued Patent: Jan. 15, 2013

(54) THREE DIMENSIONAL PROFILE INSPECTING APPARATUS

(75) Inventors: Wei Cheng Wang, Kaohsiung (TW); Shih Hsuan Kuo, Zhubei (TW); Jin Liang Chen, Shoufong Township, Haulien County (TW)

(73) Assignee: Industrial Technology Research Institute, Chutung, Hsinchu (TW)

(21) Appl. No.: 13/461,898

(22) Filed: May 2, 2012

Related U.S. Patent Documents

Reissue of:
(64) Patent No.: 7,986,402
Issued: Jul. 26, 2011
Appl. No.: 12/463,407
Filed: May 10, 2009

(30) Foreign Application Priority Data

Nov. 21, 2008 (TW) ..... 097145044

(51) Int. Cl.
*G01N 21/00* (2006.01)
*G01B 11/24* (2006.01)

(52) U.S. Cl. ..... 356/237.1; 356/237.2; 356/609; 250/201.3

(58) Field of Classification Search ..... 356/237.1, 356/237.2, 237.3, 600–610; 250/201.3, 492.2, 250/442.11; 382/128–133; 348/86–88
See application file for complete search history.

(56) References Cited

U.S. PATENT DOCUMENTS 4,185,298 A * 1/1980 Billet et al. ..... 348/129
4,739,175 A * 4/1988 Tamura ..... 250/559.34
5,583,948 A * 12/1996 Shibayama ..... 382/141
5,638,461 A * 6/1997 Fridge ..... 382/141
5,691,764 A * 11/1997 Takekoshi et al. ..... 348/86
5,852,298 A * 12/1998 Hatakeyama et al. ..... 250/492.2
6,373,520 B1 * 4/2002 Cadieux et al. ..... 348/86
6,449,048 B1 * 9/2002 Olszak ..... 356/497
6,525,810 B1 * 2/2003 Kipman ..... 356/237.1
6,954,274 B2 * 10/2005 Sasaki et al. ..... 356/606
6,987,561 B2 * 1/2006 Reznichenko et al. .... 356/237.2
7,619,190 B2 * 11/2009 Kuo et al. ..... 250/201.3
7,719,672 B2 * 5/2010 Kohayase et al. ..... 356/237.2
2005/0025353 A1 * 2/2005 Kaneko et al. ..... 382/152

FOREIGN PATENT DOCUMENTS

JP 9-311021 A 12/1997

(Continued)

OTHER PUBLICATIONS

Office Action issued on Jul. 12, 2012 for the Taiwanese counterpart application.
English Translation of Office Action issued on Jul. 12, 2012 for the Taiwanese counterpart application.

(Continued)

*Primary Examiner* — Sang Nguyen
(74) *Attorney, Agent, or Firm* — Egbert Law Offices, PLLC

(57) ABSTRACT

A three-dimensional profile inspecting apparatus includes at least two optical inspecting apparatuses and a tilt angle adjusting mechanism. The tilt angle adjusting mechanism is equipped with the at least two optical inspecting apparatuses so as to adjust the tilt angles of the at least two optical inspecting apparatuses. When the tilt angles of the optical inspecting apparatuses are changed, the focuses of the optical inspecting apparatuses remain at a single position and a subject to be inspected is within the fields of view of the optical inspecting apparatuses. The three-dimensional profile of the subject can be obtained by building the images collected by the two optical inspecting apparatuses.

11 Claims, 6 Drawing Sheets

FOREIGN PATENT DOCUMENTS

| | | | | |
|---|---|---|---|---|
| JP | 2007309718 | A | * | 11/2007 |
| TW | 1229186 | | | 3/2005 |
| TW | 200617805 | | | 6/2006 |
| TW | M339878 | U | | 9/2008 |

OTHER PUBLICATIONS

Aric Shorey, William Kordonski, Marc Tricard, "Deterministic, Precision Finishing of Domes and Conformal Optics," Proceedings of SPIE vol. 5786, pp. 310-318.

* cited by examiner

THREE DIMENSIONAL PROFILE INSPECTING APPARATUS

Matter enclosed in heavy brackets [ ] appears in the original patent but forms no part of this reissue specification; matter printed in italics indicates the additions made by reissue.

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to an optical inspecting apparatus, and more specifically, to a three-dimensional profile inspecting apparatus.

2. Description of Related Art Including Information Disclosed Under 37 CFR 1.97 and 37 CFR 1.98.

Accurate profile inspection is an important modern technology. With recent downsizing of many devices, accurate and reliable inspection technology is needed to measure dimensions and profiles of miniature structures so as to control quality and process. An optical non-contact detection technology capable of obtaining exact profile information of a subject in a non-destructive manner is required for a wide variety of applications.

Referring to FIG. 1, the objective lens used by a typical microscope 11 is frequently of a magnification ratio less than 20, and thus has a small aperture. Consequently, if the slope of a profile surface of a subject 12 to be inspected is large, the reflection light 13 from the subject 12 cannot enter the microscope 11, so the profile image of the subject 12 cannot be obtained. As a result, some profile information for the subject must be estimated by numeral interpolation, and the actual profile, dimension and roughness data cannot be acquired.

Taiwan Pat. No. 1229186 uses a linear scanning apparatus with dual view angles equipped with an inclined light source to detect approximate shapes and dimensions of a defect. The main advantages of such design include the capability to quickly inspect large areas and judge whether the defect is a protrusion or a recess. However, the apparatus cannot precisely measure the three-dimensional profile of a miniature structure, and cannot resolve the problem of difficulty in capturing the surface signal if the slope of the profile of the subject is large.

U.S. Pat. No. 6,449,048 uses an interferometer to scan the sample surface laterally with respect to the optical axis of the interferometer objective at a tilt angle, which allows the sample surface not exceed the maximum coherence plane of the interferometer. Thereby, a traditional vertical scanning interferometer (VSI) can be used to laterally scan the surface of the subject and the profile of the subject can be obtained without using image stitching technology. However, due to the limitation of the angle of the maximum coherence plane for the chosen objective, this method also cannot resolve the problem where the profile cannot be captured if the slope of the sample surface is larger than the angle of the maximum coherence plane of the interferometer. Furthermore, according to the nature of the lateral scanning at single axis, the profile of the sample surface should all be located within the maximum coherence plane along the longitudinal direction with respect to the optical axis of the interferometer objective, otherwise the complete profile cannot be obtained completely.

QED Technology™ developed a method of tilting and rotating the subject to obtain the profile of a subject with a large surface of a large slope. However, this method is restricted to the applications with small subjects, and cannot be used for large subjects that cannot be tilted.

BRIEF SUMMARY OF THE INVENTION

The present invention provides advanced detection and verification technology for gathering profiles of miniature structures, nano-analysis with large stroke and high speed measurement of sophisticated machines relating to advanced machining, pressing, grinding, and nano-processing. The present invention proposes a three-dimensional profile inspecting apparatus capable of effectively resolving the problem where the profile of a subject cannot be captured if the slope of the profile of the subject to be inspected is large, because the reflected light of the subject surface does not enter a microscope. Both simple and complex miniature structures, including nano-applications, can be inspected according to the present invention.

According to an embodiment of the present invention, a three-dimensional profile inspecting apparatus includes at least two optical inspecting apparatuses and a tilt angle adjustment mechanism. The tilt angle adjustment mechanism is equipped with the optical inspecting apparatuses to adjust the tilt angles of the optical inspecting apparatuses. When the tilt angles of the optical inspecting apparatuses are changed, the optical inspecting apparatuses maintain focuses on one a single or particular position (point) or plane, and the subject is placed within the fields of view of the optical inspecting apparatus. The three-dimensional profile of the subject is obtained by building the captured images of multiple optical inspecting apparatuses.

DETAILED DESCRIPTION OF THE INVENTION

The embodiments will be explained with the appended drawings to clearly disclose the technical characteristics of the three dimensional profile inspecting apparatus of the present invention.

Figure 1:
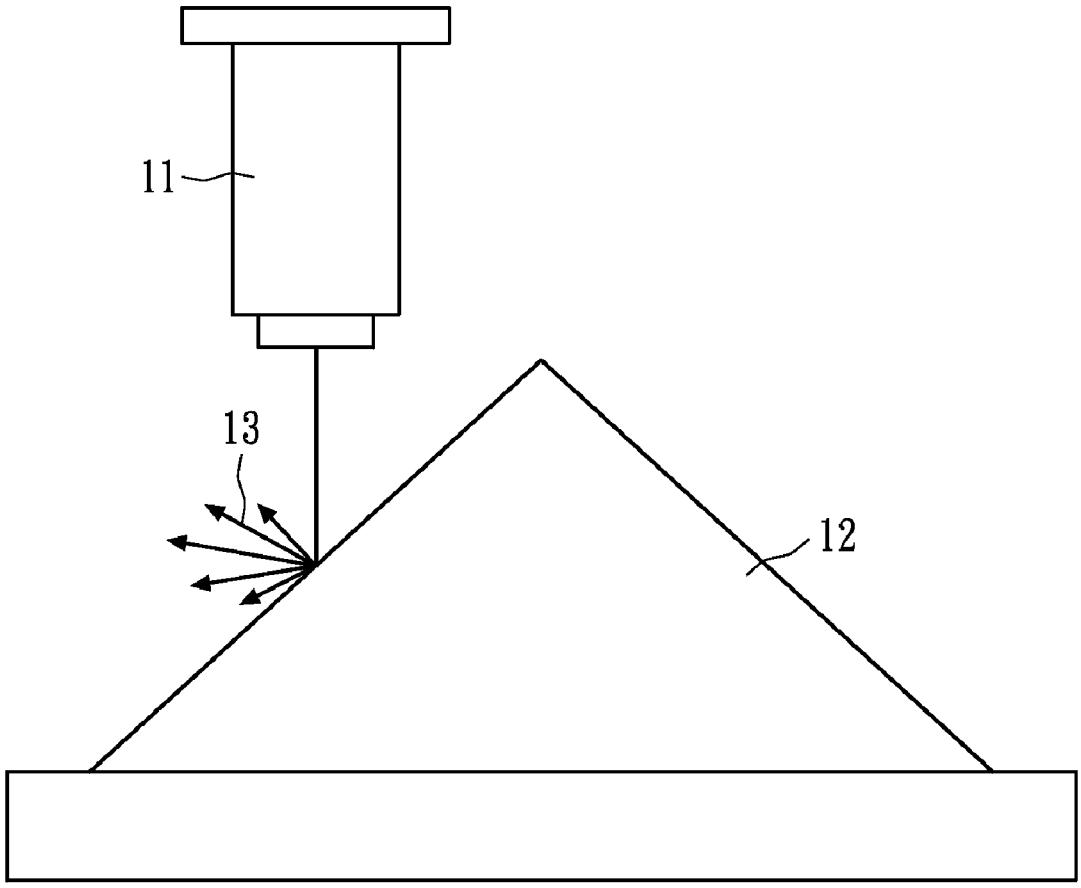
FIG. 1 (Prior Art)
FIG. 1 shows a schematic view of a known three-dimensional profile inspecting apparatus.
Figure 2:
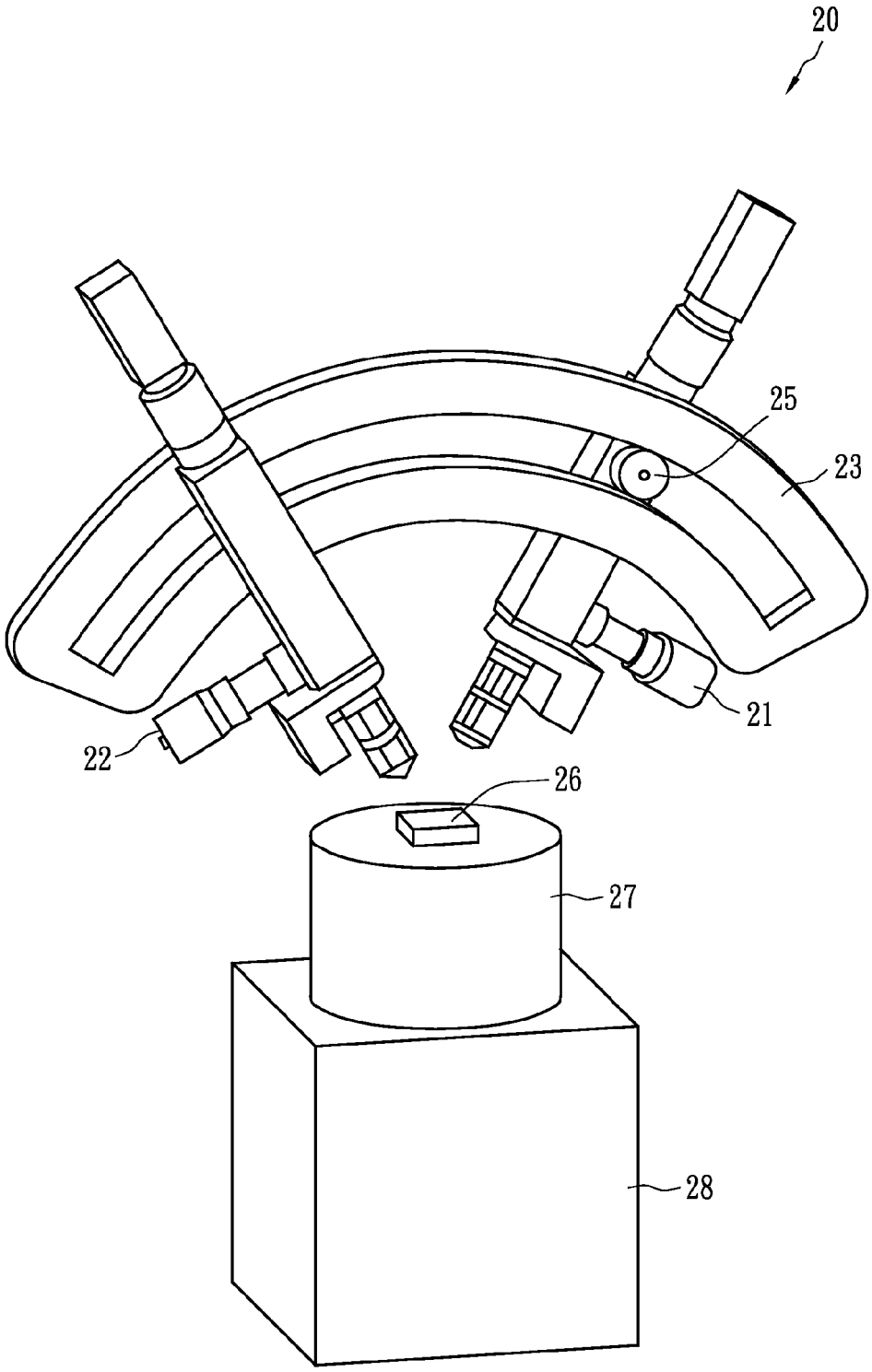
FIGS. 2 through 4 show schematic, perspective, and elevation views of a three dimensional profile inspecting apparatus in accordance with an embodiment of the present invention.

As shown in FIG. 2, a three-dimensional inspecting apparatus 20 includes two optical inspecting apparatuses 21 and 22 disposed at two sides of a circular rail 23. The optical inspecting apparatus 21 moves along the circular rail 13 via a pivotal roller 25, and the optical inspecting apparatus 22 also moves along the circular rail 23. The roller of the optical inspecting apparatus 22 is placed behind the optical inspecting apparatus 22, out of view of FIG. 2 and in a position correspond to the position of the roller 25 of the optical inspecting apparatus 21. The circular rail 23 may be formed integrally and is of superior rigidity, thereby increasing the accuracy of the movements of the optical inspecting apparatuses 21 and 22.

The tilt angles of the optical inspecting apparatuses 21 and 22 can be adjusted according to the route of the circular rail 23, i.e., the circular rail 23 is viewed as a tilt angle adjustment mechanism. The center of the circle formed by circular rail 23 is the focal point of the optical inspecting apparatuses 21 and 22, and therefore the optical inspecting apparatuses 21 and 22 remain focused on a single position or the same position (same point or focus plane) as the tilt angles of the optical inspecting apparatuses 21 and 22 are changed. In order to place the subject 26 to be inspected within the fields of view of the optical inspecting apparatuses 21 and 22 or to obtain images from multiple angles, a rotation stage 27 for a subject 26 and a moving stage 28 may be further introduced to assist in obtaining the images.

The optical inspecting apparatuses 21 and 22 gather images after tilting. The tilt angles are determined by the surface slope of the subject 26. The captured images are combined by software to build the profile of the subject 26. Moreover, the profile complex can be considered to determine whether additional rotation stage 27 and moving stage 28 for the subject 26 need to be added, so as to change the view angles or inspect positions in obtaining three-dimensional profile images from multiple angles.

Figure 3:
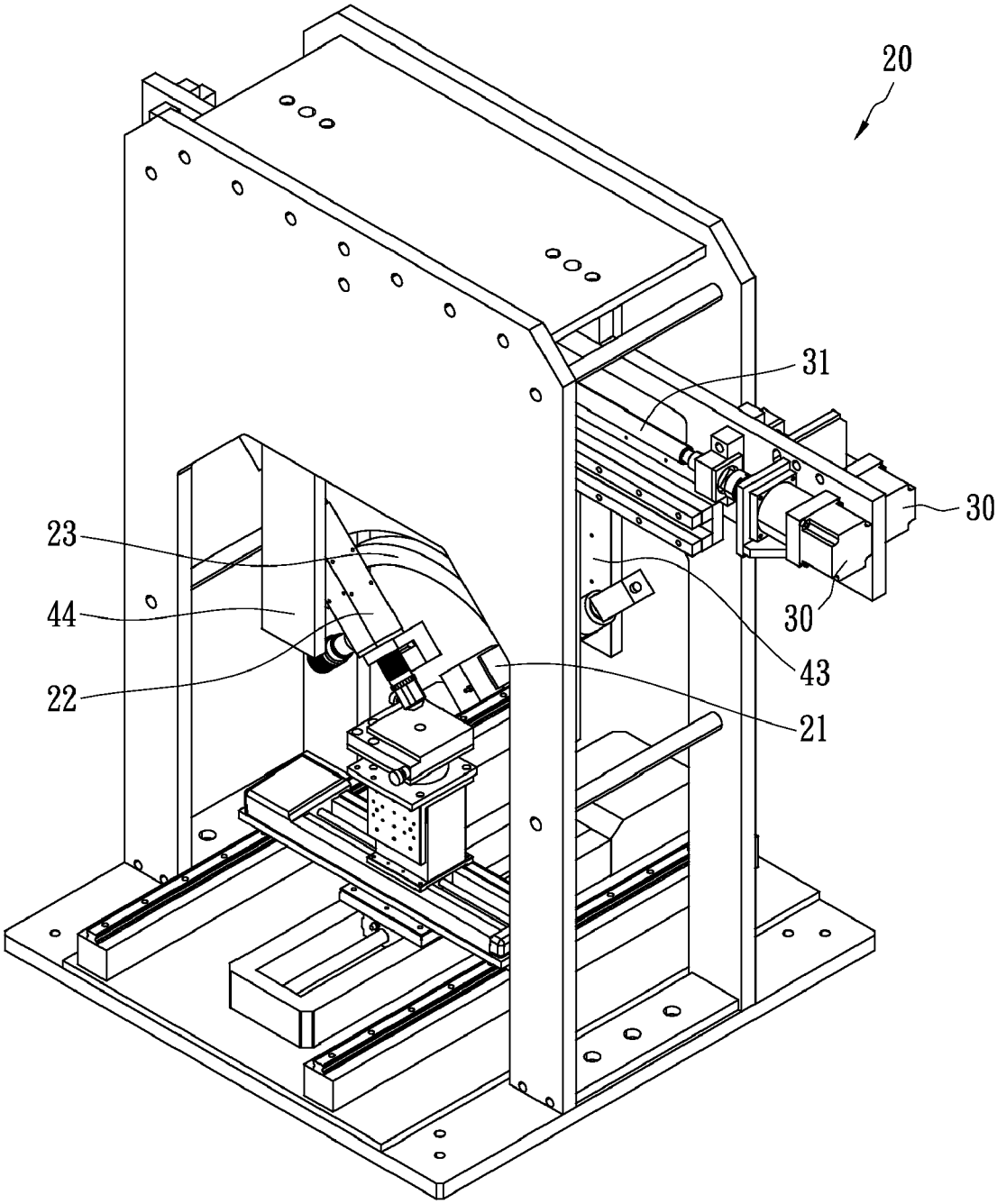
Figure 4:
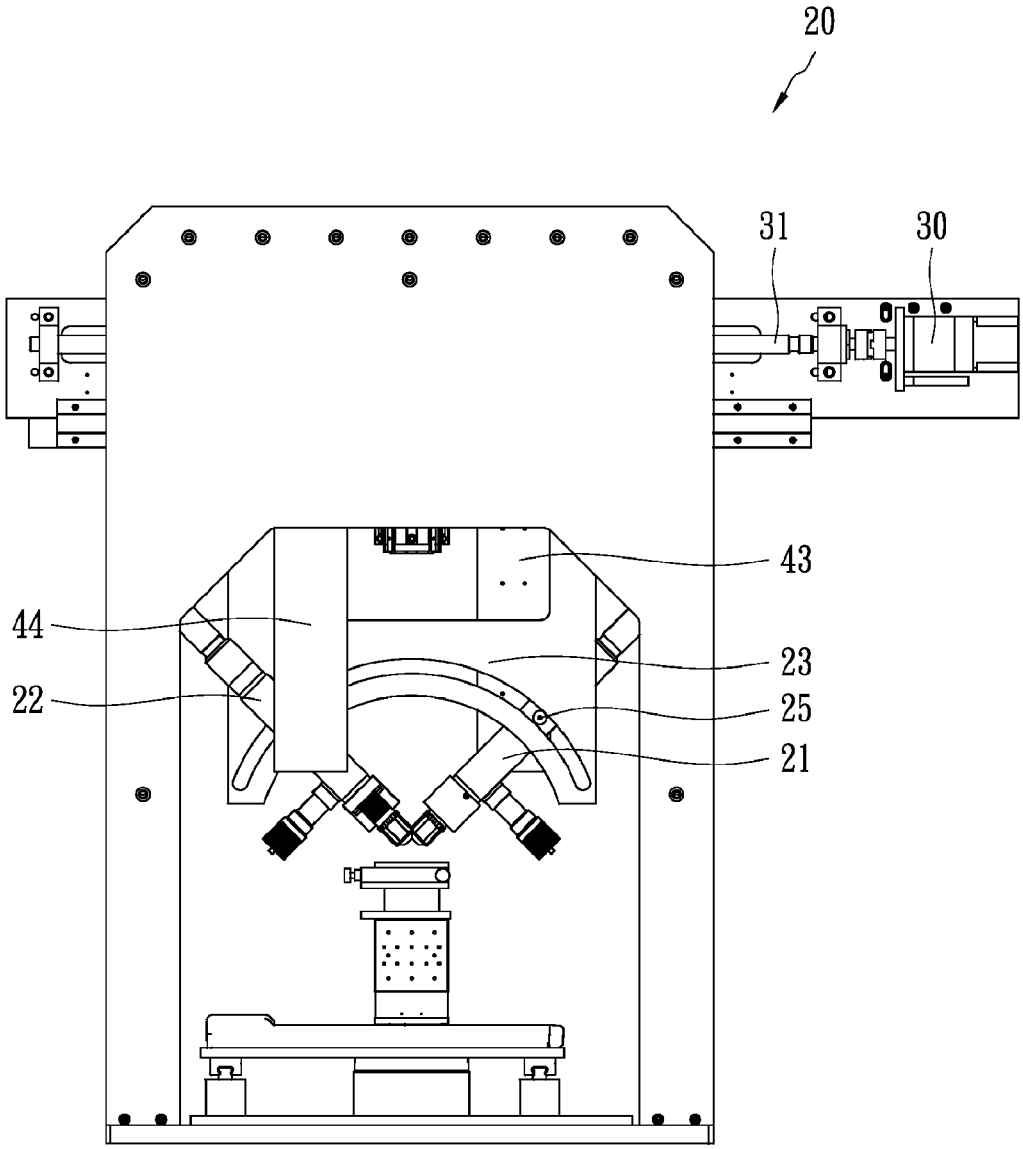

An embodiment of the above three-dimensional profile inspecting apparatus 20 is shown in FIGS. 3 and 4. FIG. 3 shows a three-dimensional view and FIG. 4 shows a side view of the profile inspecting apparatus 20. Two step motors 30 drive lead screws 31 to move connecting bars 43 and 44 that are connected to the optical inspecting apparatuses 21 and 22, thereby moving the pivotal roller 25 of each of the optical inspecting apparatuses 21 and 22 along the circular rail 23. The images captured by the optical inspecting apparatuses 21 and 22 are combined by software to build the profile of the subject. Moreover, the profile complex of the subject can be considered to determine whether the rotation stage and the moving stage are needed to change view angles and inspection positions in obtaining three-dimensional images from multiple angles.

In practice, the present invention is not restricted to the above embodiments. The circular rail can be replaced with another tilt angle adjustment mechanism such as a connection-rod mechanism, an X-Y planar moving stage or a rotation stage. The optical inspecting apparatuses 21 and 22 may be optical microscopes, non-optical microscopes and interferometers.

Figure 5:
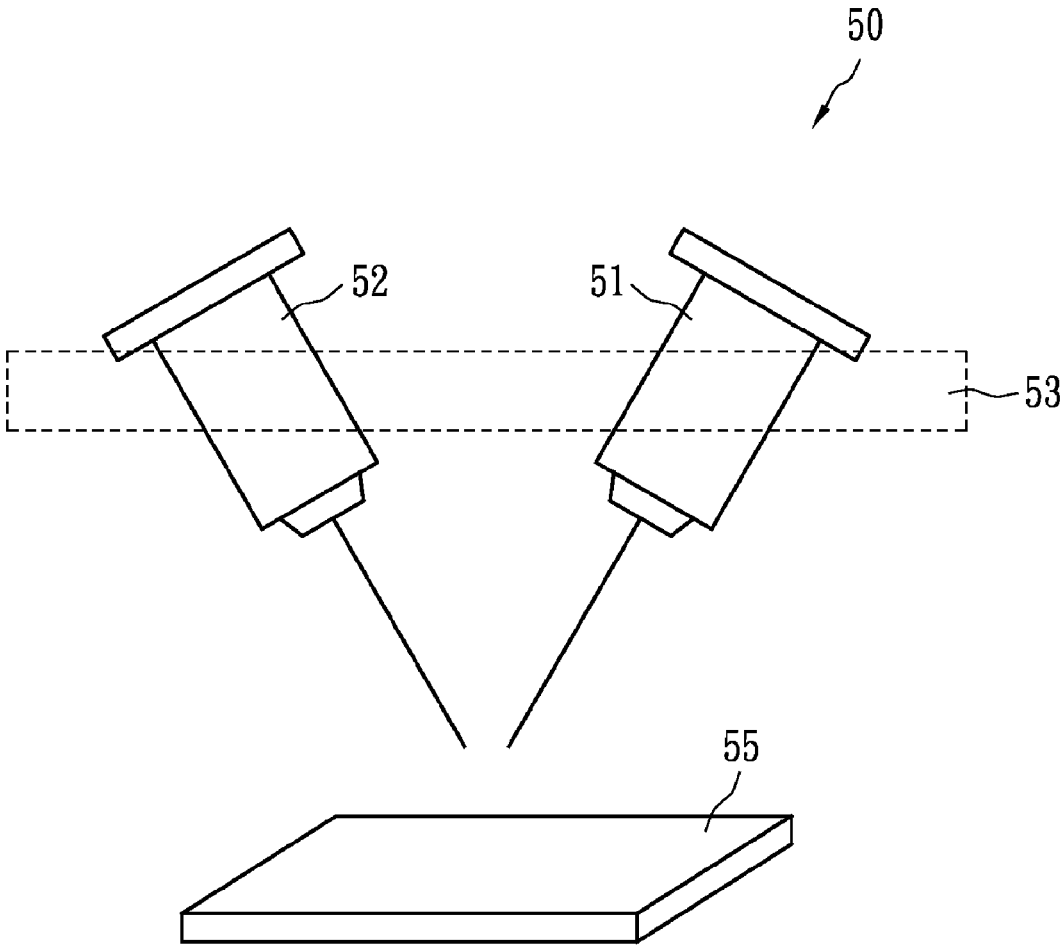
FIGS. 5 and 6 are schematic view of conceptual figures related to the three-dimensional profile inspecting apparatus of the present invention.

In summary, the concept of the present invention is shown in FIG. 5, a three-dimensional profile inspecting apparatus 50 including optical inspecting apparatuses 51 and 52 and a tilt angle adjustment mechanism 53. The tilt angles of the optical inspecting apparatuses 51 and 52 can be adjusted by the tilt angle adjustment mechanism 53, and their focuses are maintained on the same position (same focus plane) as the optical inspecting apparatuses 51 and 52 change their tilt angles, so as to inspect the profile of the subject 55. The three-dimensional inspecting apparatus 50 can be applied to simple miniature structures such as brightness enhancement films (BEF) of backlight modules.

Figure 6:
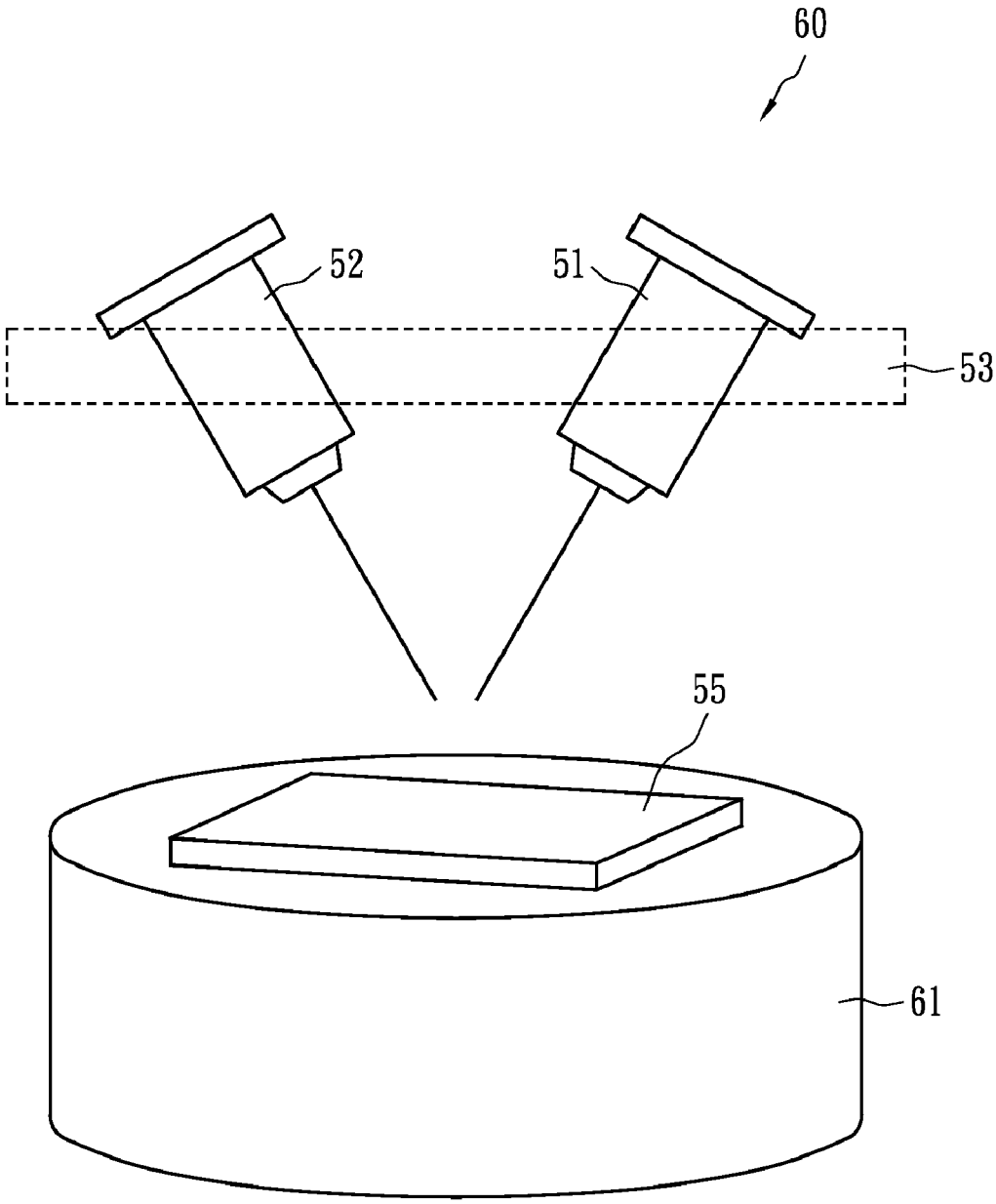

While inspecting complex curved surfaces or cone structures, the complex miniature structures may not be inspected by the two optical inspecting apparatuses and the tilt angle adjustment mechanism, and a direction angle adjustment mechanism for the subject to be inspected is further needed. Referring to FIG. 6, a three-dimensional profile inspecting apparatus 60 includes two optical inspecting apparatuses 51 and 52, a tilt angle adjustment mechanism 53, and a direction angle adjustment mechanism 61. The direction angle adjustment mechanism 61 may include a rotation stage 27 and a moving stage 28 as shown in FIG. 2.

The optical inspecting apparatuses of tilt-type of the present invention can obtain data of a profile with a large slope, and can be used for a subject that is not easily tilted. Moreover, the optical inspecting apparatuses can be adjusted to any desired angle by the tilt angle adjustment mechanism to obtain images of the subject and build the three-dimensional profile, and can inspect profile dimensions of miniature structures and subjects with large surfaces.

The apparatus of the present invention can be applied to roller mold machines used for backlight units of the panel display industry. In such applications, the accuracy of the finished subject can be inspected while the subjects are still in the machines, so the subjects do not need to be unloaded for inspection and reloaded for further processing if the accuracy is not acceptable. Eliminating such unload/reload procedures reduces process time and increases efficiency.

Also, the apparatus of the present invention can be applied to the semiconductor industry, panel display industry, miniature structure inspection for optical device industry and profile inspection of optical devices. The present invention can be used for the frame of microscopes to inspect the three-dimensional profiles of the miniature structures of a subject to be inspected, and particularly can overcome the inspection problems of subject surfaces with large slopes. Moreover, the inspecting apparatus of the present invention can inspect subjects with large surfaces such as non-spherical lenses, so as to ensure product quality and increase process efficiency.

The above-described embodiments of the present invention are intended to be illustrative only. Numerous alternative embodiments may be devised by those skilled in the art without departing from the scope of the following claims.

We claim:

1. A three-dimensional profile inspecting apparatus comprising:

at least a pair of optical-inspecting apparatuses; and a tilt angle adjustment mechanism having said at least a pair of optical-inspecting apparatuses, said tilt angle adjustment mechanism configured to adjust tilt angles of said at least a pair of optical-inspecting apparatuses, wherein said at least a pair of optical-inspecting apparatuses maintain focus on a single position and a subject to be inspected is within fields-of-view of said at least a pair of optical-inspecting apparatuses when said at least a pair of optical-inspecting apparatuses change the tilt angle, said tilt angle adjustment mechanism being a circular rail.

2. The three-dimensional profile inspecting apparatus of claim 1, said at least a pair of optical-inspecting apparatuses being equipped with pivotal rollers cooperative with said circular rail so as to allow said at least a pair of optical-inspecting apparatuses to move therealong so as to adjust the tilt angles thereof.

3. The three-dimensional profile inspecting apparatus of claim 1, said circular rail being integrally formed.

4. The three-dimensional profile inspecting apparatus of claim 1, wherein said tilt angle adjustment mechanism has at least one of a connection-rod mechanism, an X-Y planar moving stage and a rotation stage.

5. The three-dimensional profile inspecting apparatus of claim 1, further comprising:

a direction angle adjustment mechanism suitable for adjusting a direction angle of the subject.

6. The three-dimensional profile inspecting apparatus of claim 5, said direction angle adjustment mechanism comprising a moving stage and a rotation stage.

7. The three-dimensional profile inspecting apparatus of claim 1, each of the pair of optical-inspecting apparatuses having a motor and a lead screw and a connecting bar.

8. The three-dimensional profile inspecting apparatus of claim 1, the optical-inspecting apparatus being an optical microscope.

9. The three-dimensional profile inspecting apparatus of claim 1, the optical-inspecting apparatus being a non-optical microscope.

10. The three-dimensional profile inspecting apparatus of claim 1, the optical-inspecting apparatus being a interferometer.

11. The three-dimensional profile inspecting apparatus of claim 1, said at least a pair of optical-inspecting apparatuses maintaining focus on a single focus plane.

* * * * *